US009102866B2

(12) United States Patent
Seshadri et al.

(10) Patent No.: US 9,102,866 B2
(45) Date of Patent: Aug. 11, 2015

(54) RADICAL TRAP IN OIL AND GAS STIMULATION OPERATIONS

(75) Inventors: Sri R. Seshadri, Holland, PA (US); Leonard H. Palys, Downingtown, PA (US); James J. Feorino, Jr., Wilmington, DE (US)

(73) Assignee: Arkema Inc., King of Prussia, PA (US)

( * ) Notice: Subject to any disclaimer, the term of this patent is extended or adjusted under 35 U.S.C. 154(b) by 363 days.

(21) Appl. No.: 13/514,374

(22) PCT Filed: Dec. 6, 2010

(86) PCT No.: PCT/US2010/059043
§ 371 (c)(1),
(2), (4) Date: Jun. 7, 2012

(87) PCT Pub. No.: WO2011/071797
PCT Pub. Date: Jun. 16, 2011

(65) Prior Publication Data
US 2012/0241158 A1    Sep. 27, 2012

Related U.S. Application Data

(60) Provisional application No. 61/285,718, filed on Dec. 11, 2009.

(51) Int. Cl.
*E21B 43/26* (2006.01)
*C09K 8/68* (2006.01)
*C09K 8/70* (2006.01)
*C09K 8/88* (2006.01)

(52) U.S. Cl.
CPC ... *C09K 8/68* (2013.01); *C09K 8/70* (2013.01); *C09K 8/88* (2013.01); *E21B 43/26* (2013.01); *C09K 2208/26* (2013.01)

(58) Field of Classification Search
CPC ...... C09K 8/68; C09K 2208/26; C09K 8/805; C09K 8/62; C09K 8/685; C09K 8/602; C09K 8/524; C09K 8/74; C09K 8/80; E21B 43/267; E21B 43/26; E21B 43/25
See application file for complete search history.

(56) References Cited

U.S. PATENT DOCUMENTS

| 3,922,173 A | 11/1975 | Misak |
| 4,900,469 A | 2/1990 | Farr et al. |
| 5,103,905 A | 4/1992 | Brannon et al. |
| 5,393,439 A | 2/1995 | Laramay et al. |

(Continued)

FOREIGN PATENT DOCUMENTS

| RU | 2116433 C1 | 7/1998 |
| RU | 2117147 C1 | 8/1998 |

*Primary Examiner* — Zakiya W Bates
(74) *Attorney, Agent, or Firm* — Lynn B. Morreale (57) ABSTRACT

A method for using a fracture fluid in forming subterranean fractures includes delaying degradation of a polymer in a fracture fluid when the fracture fluid comprises a breaker by combining at least one radical scavenger with the fracture fluid. The mixture for use in a fracture fluid comprises a radical scavenger and a breaker. A method of fracturing a subterranean formation may include providing a fracture fluid comprising a proppant, a polymer, and a breaker and adding a radical scavenger to the fracture fluid. The fracture fluid is supplied to a desired location in the subterranean formation to form at least one fracture where the viscosity of the fracture fluid is maintained. The breaker is then allowed to degrade the polymer and reduce the viscosity of the fracture fluid at a specific time or temperature.

18 Claims, 1 Drawing Sheet

(56) References Cited

U.S. PATENT DOCUMENTS

| | | |
|---|---|---|
| 5,399,269 A | 3/1995 | Moradi-Araghi |
| 5,447,199 A | 9/1995 | Dawson et al. |
| 6,138,760 A | 10/2000 | Lopez et al. |
| 6,342,647 B1 | 1/2002 | Roof et al. |
| 6,924,254 B2 | 8/2005 | Todd |
| 7,090,015 B2 | 8/2006 | Todd |
| 7,256,160 B2 | 8/2007 | Crews |
| 7,678,745 B2 | 3/2010 | Parris et al. |
| 7,879,770 B2 | 2/2011 | Lin et al. |
| 2006/0166836 A1 | 7/2006 | Pena et al. |
| 2007/0277978 A1 | 12/2007 | Reddy et al. |
| 2008/0070813 A1 | 3/2008 | Lin et al. |
| 2009/0095472 A1 | 4/2009 | Andersson et al. |
| 2009/0107681 A1 | 4/2009 | Hough et al. |
| 2010/0048429 A1 | 2/2010 | Dobson, Jr. et al. |
| 2010/0096139 A1 | 4/2010 | Holcomb et al. |
| 2010/0252264 A1 | 10/2010 | Hutchins et al. |

US 9,102,866 B2

RADICAL TRAP IN OIL AND GAS STIMULATION OPERATIONS

FIELD OF THE INVENTION

The invention relates to compositions for use in fracture fluids, fracture fluid compositions, and methods of using the fracture fluids to fracture subterranean formations in oil and gas recovery.

BACKGROUND OF THE INVENTION

Hydraulic fracturing and fracture-acidizing are techniques commonly utilized to stimulate the production of oil and gas from subterranean formations of low permeability. In such treatments, fracturing fluids are introduced into the subterranean formation under sufficient pressure and having sufficient viscosity to create cracks or fractures in the formation and to also propagate these fractures out into the formation. The fracture fluids may contain entrained proppants, such as sand or sintered bauxite, so that as the fracture fluid seeps into the formation or is backflowed out from the fractures, the fractures close upon the proppants to maintain the fractures in an open state for increased permeability.

In using certain fracture fluids, such as high viscosity aqueous gels, water-hydrocarbon emulsions, or oil-based fluids, the high viscosity of these fracturing fluids should be maintained while the fractures are being created and propagated, as well as to aid in transporting the proppants to the farthest reaches of the fractures. After the proppants have been trapped in the fractures, however, it is desirable that the viscosity of the fracture fluids are quickly reduced to allow the fluids to flow back through the fractures, around the proppants and back into the wellbore. Chemicals utilized to reduce the viscosity of fracturing fluids are commonly called "breakers" or "breaker fluids" and are introduced into the fractures to act upon the fracturing fluids. The breakers, however, may be difficult to control. For example, when the breakers are introduced with the fracture fluid, they may immediately begin to reduce the viscosity of the fracture fluid before the fractures are able to form and/or the proppants are deposited. Thus, the breakers may break down the fracture fluids prematurely or at an inappropriate time.

SUMMARY OF THE INVENTION

The mixtures and methods of the present invention control the viscosity of the polymer in the fracture fluid by delaying or retarding the degradation of the polymer with a radical scavenger or trap until certain conditions are met, e.g., at a certain temperature profile or pH. Thus, the viscosity of the fracture fluids may be maintained for a certain period of time, and once fracturing is complete, the breakers can degrade the polymers in the fracture fluids in a controlled manner. Aspects of the present invention include compositions for use in a fracture fluid, fracture fluid compositions, methods of using the fracture fluid, and methods of fracturing subterranean formations.

According to an embodiment of the present invention, a method for using a fracture fluid in forming subterranean fractures comprises delaying degradation of a polymer in a fracture fluid when the fracture fluid comprises a breaker by combining at least one radical scavenger with the fracture fluid.

According to another embodiment of the present invention, a mixture for use in a fracture fluid comprises a radical scavenger and a breaker.

According to another embodiment of the present invention, a fracture fluid mixture comprises a proppant, a water soluble or water swellable polymer, a radical scavenger, a breaker, and an aqueous fluid.

According to another embodiment of the present invention, a method of using a fracture fluid in a fracturing operation comprises introducing a fracture fluid comprising a proppant and a polymer into a subterranean formation to form at least one fracture. The proppant is deposited into the fracture, and subsequently, the viscosity of the fracture fluid is reduced with a breaker where degradation of the polymer is delayed by adding a radical scavenger to the fracture fluid.

According to another embodiment of the present invention, a method of fracturing a subterranean formation comprises providing a fracture fluid comprising a proppant, a polymer, and a breaker, and adding a radical scavenger to the fracture fluid. The fracture fluid is supplied to a desired location in a subterranean formation. The fracture fluid is maintained with sufficient viscosity to form at least one fracture. The breaker is allowed to degrade the polymer and reduce the viscosity of the fracture fluid at a specific time or temperature.

DETAILED DESCRIPTION OF THE INVENTION

Aspects of the present invention include compositions for use in fracture fluids, fracture fluid compositions, methods for using the fracture fluids, and methods for forming subterranean formations.

As used herein, "fracture fluid" or "fracturing fluid" may be used interchangeably to define a fluid suitable for use in fracturing, gravel packing, acidizing fluids, etc. In particular, the fracture fluid is suitable for use in hydraulic fracturing operations for enhanced oil and gas recovery.

As used herein, "breaker," "breaking fluid," "free-radical breaker," or "free radical generator" may be used to define a compound that reduces the viscosity of the fracture fluid. The breakers may work in any suitable manner, for example, by degrading the polymers by attacking the cross-links, cleaving the polymer chain, etc.

As used herein, "viscosity" is understood under its ordinary and customary meaning as a measure of the internal resistance of a fluid (or a measure of fluid friction). It should be generally understood by one skilled in the art that a fluid with a higher viscosity is "thicker" than a fluid with a lower viscosity. Appropriate viscosities of the fracture fluid during fracturing and recovery of the fracture fluid would be readily ascertainable by one skilled in the art.

As used herein, "degradation of the polymer" or "degradation of the fracture fluid" is intended to encompass a break down or decomposition of the fracture fluid or the polymer in the fracture fluid. In other words, the polymer may decompose into smaller compounds or the molecular weight of the polymer may be lowered causing the viscosity of the fracture fluid to be reduced.

As used herein, unless specified otherwise, the values of the constituents or components of the compositions are expressed in weight percent or % by weight of each ingredient in the composition.

Due to the uncontrolled degradation of the fracture fluid during fracturing operations, there is a need to stabilize the fracture fluids, especially at higher temperatures, to maintain desirable high solution viscosity during fracturing. After the fracturing is completed, however, these viscous fracture fluids need to be degraded to allow the flow of the gas or oil from the fractured rock that is propped open by the proppant. Thus, in order to control or retard the degradation of the fracture fluid until a suitable time or at suitable conditions, at least one radical scavenger is combined with the fracture fluid. According to one aspect of the present invention, a method for using a fracture fluid in forming subterranean fractures comprises delaying degradation of a polymer in a fracture fluid when the fracture fluid comprises a breaker by combining at least one radical scavenger with the fracture fluid.

The radical scavenger (also known as a radical trap) enables the polymers in the fracture fluid to maintain a desired high viscosity of the fracture fluid longer, particularly at downhole well temperatures. Thus, at least one radical scavenger works to protect the viscosity of the polymer under various temperatures to allow appropriate fracturing of the rock and/or deposition of the proppant in the fractures. Suitable radical scavengers may be classified, for example, into two families, among others: (1) nitroxide radicals; and (2) antioxidants. Without wishing to be bound to a particular theory, it is believed that the nitroxide radical acts to scavenge the polymer in order to delay degradation of the polymer whereas an antioxidant works to scavenge radicals from the breaker. For example, the nitroxide free-radicals may only act on carbon-centered free-radicals, and hindered phenols, quinones, hydroquinones, natural antioxidants, and DEHA-type compounds may trap peroxy radicals directly. Thus, regardless of the mechanism of action, the effect of the radical scavenger is to delay or retard the degradation of the polymer in a controlled fashion. Moreover, the mechanisms of action may be combined to enhance or further control the desired effect.

Any radical scavenger suitable for delaying the degradation of the fracture fluid in a controlled manner may be used. The radical scavengers (traps) include, but are not limited to, TEMPO free radicals, SG-1 free radicals, slow polymerizing monomers, alpha methyl styrene dimer, MAPAE (methoxyallylphenyl allylether), DEHA (diethylhydroxylamine), quinone compounds, hindered phenol antioxidant type radical scavengers, and combinations thereof. The radical scavengers discussed herein are suitable for use alone or in combination.

In an embodiment of the present invention, the radical scavenger comprises a nitroxide radical. Suitable nitroxide living free radicals include, but are not limited to, SG-1 (nitroxide, 1-(diethoxyphosphinyl)-2,2-dimethylpropyl 1,1-dimethylethyl free radical); TEMPO free radicals (2,2,6,6-tetramethyl-1-piperidinyloxy free radical); PROXYL free radicals (2,2,5,5-tetramethyl-1-pyrrolidinyloxy free radical); and mixtures thereof.

TEMPO free radicals and their deriviatives may include, for example, 4-hydroxy TEMPO free radical (4-hydroxy-2,2,6,6-tetramethyl-1-piperidinyloxy free radical); TEMPO-Polymer Bound or PS-TEMPO (2,2,6,6-tetramethyl-1-piperidinyloxy free radical)-polymer bound; 4-(2-bromoacetamido)-TEMPO free radical (4-(2-bromoacetamido)-2,2,6,6-tetramethyl-1-piperidinyloxy free radical); 4-(2-iodoacetamido)-TEMPO free radical (4-(2-iodoacetamido)-2,2,6,6-tetramethyl-1-piperidinyloxy free radical); 4-acetamido-TEMPO free radical (4-acetamido-2,2,6,6-tetramethylpiperidine 1-oxyl free radical); 4-amino-TEMPO free radical (4-amino-2,2,6,6-tetramethylpiperidine-1-oxyl free radical); 4-carboxy-TEMPO free radical (4-carboxy-2,2,6,6-tetramethylpiperidinyloxy, free radical); 4-hydroxy-TEMPO benzoate free radical (4-hydroxy-2,2,6,6-tetramethylpiperidine 1-oxyl benzoate free radical); 4-maleimido-TEMPO free radical (4-maleimido-2,2,6,6-tetramethyl-1-piperidinyloxy free radical); 4-methoxy-TEMPO free radical (4-methoxy-2,2,6,6-tetramethyl-1-piperidinyloxy free radical); 4-oxo-TEMPO free radical (4-oxo-2,2,6,6-tetramethyl-1-piperidinyloxy free radical); 4-phosphonooxy-TEMPO hydrate free radical (4-phosphonooxy-2,2,6,6-tetramethyl-1-piperidinyloxy, free radical hydrate); and mixtures thereof.

PROXYL free radicals and their derivatives may include, for example, 3-(2-iodoacetamido)-PROXYL free radical (3-(2-iodoacetamido)-2,2,5,5-tetramethyl-1-pyrrolidinyloxy free radical); 3-[2-(2-maleimidoethoxy)ethylcarbamoyl]-PROXYL free radical (3-[2-(2-maleimidoethoxy)ethylcarbamoyl]-2,2,5,5-tetramethyl-1-pyrrolidinyloxy free radical); 3-carbamoyl-PROXYL free radical (3-carbamoyl-2,2,5,5-tetramethylpyrrolidin-1-yloxy free radical); 3-cyano-PROXYL free radical (3-cyano-2,2,5,5-tetramethyl-1-pyrrolidinyloxy free radical); 3-maleimido-PROXYL free radical (3-maleimido-2,2,5,5-tetramethyl-1-pyrrolidinyloxy free radical); 3-(2-bromo-acetoamido-methyl)-PROXYL free radical (3-(2-bromo-p-acetoamido-methyl)-2,2,5,5-tetramethyl-1-pyrrolidinyloxy free radical); 3-(2-(2-iodoacetamido)acetamido)-PROXYL free radical (3-(2-(2-iodoacetamido)acetamido)-2,2,5,5-tetramethylpyrrolidin-1-yloxy free radical); 3-(2-isothiocyanato-ethyl-carbamoyl)-PROXYL free radical (3-(2-isothiocyanato-ethyl-carbamoyl)-2,2,5,5-tetramethylpyrrolidin-1-yloxy free radical); 3-(3-(2-iodo-acetamido)-propyl-carbamoyl)-PROXYL free radical (3-(3-(2-iodo-acetamido)-propyl-carbamoyl)-2,2,5,5-tetramethylpyrrolidin-1-yloxy free radical); and mixtures thereof.

Other suitable nitroxide free radicals include, for example, 16-doxyl-stearic acid methyl ester free radical; 2,2,3,4,5,5-hexamethyl-3-imidazolinium-1-yloxy methyl sulfate free radical; 2,2,6,6-tetramethyl-4-(methylsulfonyloxy)-1-piperidinooxy free radical; 4-(1-hydroxy-1-methylethyl)2,2,5,5-tetramethyl-3-imidazolinium-1-yloxy free radical; 4-phenacylidene-2,2,5,5-tetramethylimidazolidazolidin-1-yloxy free radical; 4-phenyl-2,2,5,5-tetramethyl-3-imidazolin-1-yloxy free radical; 5-DOXYL-stearic acid free radical (2-(3-carboxypropyl)-4,4-dimethyl-2-tridecyl-3-oxazolidinyloxy free radical); methyl 5-DOXYL stearate free radical (2-(4-methoxy-4-oxobutyl)-4,4-dimethyl-2-tridecyl-3-oxazolidinyloxy free radical); 1-hydroxy-2,2,4,6,6-pentamethyl-4-piperidinyl 3,5-di-tert-butyl-4-hydroxybenzoate free radical; 1-hydroxy-2,2,5,5-tetramethyl-2,5-dihydro-1H-pyrrole-3-carboxylic acid free radical; 4-[(1-hydroxy-2,2,6,6-tetramethyl-4-piperidinyl)amino]-4-oxo-2-butenoic acid free radical; bis(1-hydroxy-2,2,4,6,6-pentamethyl-4-piperidinyl)oxalate free radical; tris(1-hydroxy-2,2,4,6,6-pentamethyl-4-piperidinyl) phosphinetricarboxylate free radical; CYPMPO (2-(5,5-dimethyl-2-oxo-2-lambda-5-[1,3,2]dioxaphosphinan-2-yl)-2-methyl-3,4-dihydro-2H-pyrrole-1-oxide free radical); 5-(2,2-dimethyl-1,3-propoxy cyclophosphoryl)-5-methyl-1-pyrroline N-oxide free radical; and mixtures thereof.

Non-nitroxide types of living free radical compounds may also be suitable. Non-nitroxide type radicals may include, for example, 3-beta-doxyl-5 alpha-cholestane free radical; galvinoxyl free radical (also known as 2,6-di-tert-butyl-alpha-(3,5-di-tert-butyl-4-oxo-2,5,-cyclohexadien-1-ylidene)-paratolyloxy free radical); and mixtures thereof.

In an exemplary embodiment, the radical scavenger is selected from the group consisting of 2,2,6,6-tetramethylpiperidine-1-oxyl; 4-hydroxy-2,2,6,6-tetramethylpiperidine-1-oxyl; nitroxide radicals, 1-(diethoxyphosphinyl)-2,2-dimethylpropyl 1,1-dimethylethyl; and mixtures thereof.

A suitable radical scavenger may include a slow polymerizing monomer. By slow polymerizing monomer, it is intended to mean a monomer that reacts at a slow rate as would be understood by one skilled in the art. Slow polymerizing monomers may include, for example, dibutyl maleate, allyl malonic ester, nonyl maleate ester, diethyl fumarate.

A radical scavenger may also include quinone-type free radical traps. Exemplary quinone-type free radical traps may include, for example, quinone, hydroquinone, and phenol or catechol type of free radical traps. Examples of such quinone-type free radicals include p-benzoquinone; hydroquinone (1,4-benzenediol or 1,4-dihydroxybenzene); hydroquinone monomethyl ether (4-hydroxyanisole, MEHQ, or 4-methoxyphenol); hydroquinone monoethyl ether; HQMME (hydroquinone monomethyl ether); hydroquinone monophenyl ether; MTBHQ (mono-t-butyl hydroquinone); di-t-butyl hydroquinone; di-t-amyl hydroquinone; toluhydroquinone; p-benzoquinone; p-benzoquinone dioxime; 2,6-dichloro-1,4-benzoquinone; 2,3,5,6-tetramethyl-1,4-benzoquinone, 2,5-dichloro-3,6-dihydroxy-p-benzoquinone; methyl-p-benzoquinone; 6-anilinoquinoline-5,8-quinone; pyrroloquinoline quinone; 2-allyl-6-methoxybenzo-1,4-quinone; quinhydrone (hydroquinone:benzoquinone 1:1 complex); 2,5-bis(morpholinomethyl)hydroquinone; 2-phenylhydroquinone; 1,2,4-benzenetriol (hydroxyhydroquinone); 4-mercaptophenol; bromohydroquinone; chlorohydroquinone; pyrocatechol (1,2-benzenediol or 1,2-dihydroxybenzene or catechol); tert-butyl catechol; resorcinol (1,3-benzenediol), and mixtures thereof.

Compounds known as hindered phenol antioxidants may be used in combination or alone with the other radical scavengers defined herein. Particularly suitable hindered phenol antioxidants include compounds containing aromatic compounds containing at least one tertiary butyl group attached to a ring carbon adjacent to a ring carbon to which a hydroxyl group is attached. Suitable hindered phenol antioxidants may include BHT (butylated hydroxytoluene); BHA (butylated hydroxyanisole); IRGANOX® 1010, a phenolic based antioxidant, IRGANOX® 1076, a monofunctional hindered phenolic, each obtainable from ° BA® part of BASF with U.S. headquarters in Florham Park, N.J.; and ETHANOX® 703 (2,6-di-tertiary-butyl-N,N-dimethylamino-p-cresol) an antioxidant obtainable from ALBEMARLE® Corporation with offices in Baton Rouge, La.

Other radical scavengers that may be suitable include triethanol amine, various alcohols, and amine compounds, such as DEHA (diethylhydroxylamine) and other hydroxyalkylamines. Other free radical scavengers may include bioflavonoids like Naringenin or Tocopherols (TCP) also known as tocotrienols. Tocopherols are a class of chemical compounds where many have vitamin E activity. The advantage of tocopherols is that they are considered GRAS (generally regarded as safe). Other GRAS compounds may include natural oils, for example, clove oil. Additional radical scavengers may also include specific unsaturated molecules that possess very easily extractable hydrogens, i.e., allylic hydrogens and tertiary hydrogens, such as MAPAE (methoxyallylphenyl allylether), alpha methyl styrene, alpha methyl styrene dimer, dibutyl maleate, allyl malonic ester, various mono-allylic compounds, nonyl maleate ester, and diethyl fumarate.

In an exemplary embodiment, the radical scavenger is selected from the group consisting of 2,2,6,6-tetramethylpiperidine-1-oxyl (TEMPO); 4-hydroxy-2,2,6,6-tetramethylpiperidine-1-oxyl (4-hydroxy TEMPO); nitroxide, 1-(diethoxyphosphinyl)-2,2-dimethylpropyl 1,1-dimethylethyl (SG-1); slow polymerizing monomers; quinones; hindered phenols; and mixtures thereof.

At least one radical scavenger is combined with the fracture fluid. The radical scavenger may be combined with the fracture fluid at any suitable time and using any suitable techniques known in the art. For example, the at least one radical scavenger may be added and mixed with the fracture fluid prior to supplying the fracture fluid to the subterranean rock formation. Alternatively, the fracture fluid can be simultaneously mixed with the at least one radical scavenger when pumping the fracture fluid into the wells. Additionally, the at least one radical scavenger could be added at some time subsequent to the introduction of the fracture fluid into the well bore.

The fracture fluid comprises at least one breaker in order to break down the viscosity of the fracture fluid after the fracturing process and/or depositing the proppant in the cracks. The breaker may include any breaker suitable in reducing the viscosity of the polymer in the fracture fluid or the fracture fluid itself. According to an exemplary embodiment, the breaker is selected from the group consisting of organic peroxides, inorganic peroxides, azo initiators, oxidizing agents, bromates, sulfates, persulfates, and mixtures thereof. The breaker may be a free-radical breaker. The free-radical breaker is preferably a room temperature stable organic peroxide, inorganic peroxide, azo initiator, or combination thereof. More preferably, the peroxide and/or azo initiator are water soluble. However, the peroxides or azo initiators may be water insoluble, partially water soluble, or fully water soluble.

Suitable organic peroxides include, for example, diacyl peroxides, peroxyester peroxides, monoperoxycarbonate peroxides, peroxyketal peroxides, hydroperoxides, solid peroxydicarbonate peroxides, ketone peroxides, endoperoxides, and dialkyl peroxides. Suitable organic peroxides are described, for example, in U.S. Pat. No. 5,447,199 and U.S. Publication No. 2007/0284101 A1, both of which are herein incorporated by reference in their entirety for all purposes. Any of the peroxides described herein may be deemed room temperature stable peroxides.

Suitable peroxyesters may include, for example: di-tert-butyl diperoxyphthalate; di-tert-amyl dip eroxyphthalate; tert-butyl peroxybenzoate; tert-amyl peroxybenzoate; tert-butyl peroxyacetate; tert-amyl peroxyacetate; 2,5-di(benzoylperoxy)-2,5-dimethylhexane; tert-butyl peroxymaleate; tert-amyl peroxymaleate; tert-butyl peroxy-2-ethylhexanoate; tert-butyl peroxyisobutyrate; tert-amyl peroxyisobutyrate; di(tert-butylperoxy)fumarate; tert-butyl peroxy(2-ethylbutyrate); tert-butyl peroxy-2-ethylhexanoate; tert-amyl peroxy-2-ethylhexanoate; 2,5-di(2-ethylhexanoylperoxy)-2,5-dimethylhexane; t-butyl peroxy 3,5,5-trimethylhexanoate; t-amyl peroxy 3,5,5-trimethylhexanoate; 1,1-dimethyl-3-hydroxy-butylperoxy-2-ethylhexanoate; tert-butylperoxy-3-carboxypropionate; tert-amylperoxy-3-carboxypropionate; 3-hydroxy-1,1-dimethylbutyl 2-ethyl-peroxyhexanoate; and mixtures thereof.

Suitable monoperoxycarbonate peroxides may include, for example: OO-tert-butyl-O-(isopropyl) monoperoxycarbonate; OO-tert-amyl-O-(isopropyl)monoperoxycarbonate; OO-tert-butyl-O-(2-ethylhexyl)monoperoxycarbonate; OO-tert-amyl-O-(2-ethylhexyl)monoperoxycarbonate; polyether poly(OO-tert-butyl monoperoxycarbonate); OO-t-butyl-O-polycaprolactone monoperoxy carbonate; 2,5-dimethyl-2,5-bis(isopropoxycarbonyl-peroxy)hexane; 2,5-dimethyl-2,5-bis(isopropoxycarbonyl-peroxy)hexyne-3; and mixtures thereof.

Suitable peroxyketal peroxides may include, for example: 1,1-di(tert-butylperoxy)-3,3,5-trimethylcyclohexane; 1-tert-amylperoxy-1-methoxy cyclohexane; 1-tert-butylperoxy-1- methoxy cyclohexane; 1,1-di(tert-butylperoxy)cyclohexane; 1,1-di(tert-amylperoxy)cyclohexane; n-butyl-4,4-di(tert-butylperoxy)valerate; 4,4-bis(tert-butylperoxy)valeric acid; ethyl-3,3-di(tert-amylperoxy)butanoate; ethyl-3,3-di(tert-butylperoxy)butanoate; ethyl-3,3-di(tert-butylperoxy)butyrate; 2,2-di(tert-butylperoxy)butane; 2,2-di(tert-amylperoxy)butane (Lup 520); 2,2-di(tert-butylperoxy)propane; 2,2-di(tert-amylperoxy)propane; 2,2-di(tert-butylperoxy)4-methylpentane; 2,2-bis(4,4-di[tert-amylperoxy]cyclohexyl) propane; and mixtures thereof.

Suitable diacyl peroxides may include, for example: didecanoyl peroxide; dilauroyl peroxide; dibenzoyl peroxide; di(methyl benzoyl)peroxide; 2,4-dichlorobenzoyl peroxide; and mixtures thereof.

Suitable ketone peroxides may include, for example: 2,4-pentanedione peroxide; methyl ethyl ketone peroxide; methyl isobutyl ketone peroxide; and mixtures thereof.

Suitable hydroperoxides may include, for example: 2,5-dihydroperoxy-2,5-dimethylhexane; cumene hydroperoxide; t-butyl hydroperoxide; t-amyl hydroperoxide; t-octyl hydroperoxide; hydrogen peroxide ($H_2O_2$); 1,1,3,3-tetramethylbutyl hydroperoxide; para-methane hydroperoxide; diisopropylbenzene monohydroperoxide; diisopropylbenzene dihydroperoxide; and mixtures thereof.

Suitable solid peroxydicarbonate peroxides may include, for example: di(4-tert-butylcyclohexyl)peroxydicarbonate; di(cyclohexyl)peroxydicarbonate; di(2-phenoxyethyl)peroxydicarbonate; dimyristyl peroxydicarbonate; dicetyl peroxydicarbonate; and mixtures thereof.

Suitable azo initiators may include, for example: 2,2'-azobis(isobutyronitrile) (e.g., DUPONT™ VAZO® 64); 2,2'-Azobis(2-methylbutyronitrile) (e.g., DUPONT™ VAZO® 67); 2-tert-butylazo-2-cyanobutane; 2-tert-butylazo-2-cyanopropane; 1,1'-azobis(cyanocyclohexane) (e.g., DUPONT™ VAZO® 88); 4,4'-azobis(4-cyanovaleric acid) (e.g., DUPONT™ VAZO® 68 WSP); and mixtures thereof. The breaker may also include azonitrile (e.g., DUPONT™ VAZO® 82) types.

Suitable dialkyl peroxides may include, for example: dicumyl peroxide; isopropenyleumyl cumyl peroxide; isopropylcumyl cumyl peroxide; m/p-di-tert-butylperoxydiisopropylbenzene (a,a'-bis(tert-butylperoxy)diisopropylbenzene); tert-butylperoxyisopropylbenzene (tert-butyl cumyl peroxide); m-isopropylolcumyl t-butyl peroxide (tert-butyl 3-isopropylolcumylperoxide); tert-butyl-3-isopropenylcumyl peroxide (m-isopropenylcumyl tert-butyl peroxide); tert-butyl-4-isopropenylcumyl peroxide; tert-butyl-3-isopropylcumyl peroxide; m/p-acetylcumyl t-butyl peroxide; 2,4-diallyloxy-6-tert-butylperoxide-1,3,5-triazine; 3,3,5,7,7-pentamethyl-1,2,4-trioxepane (e.g., AKZO NOBEL TRIGONOX® 311); 3,6,9-triethyl-3,6,9-trimethyl-1,4,7-triperoxonane (e.g., AKZO NOBEL TRIGONOX® 301); di-tert-butyl peroxide; 2-methoxy-2-tert-butylperoxy propane; di-tert-amyl peroxide; 2,5-dimethyl-2,5-di(tert-butylperoxy) hexane; 2,5-dimethyl-2,5-di(tert-amylperoxy)hexane; 2,5-dimethyl-2,5-di(tert-butylperoxy)hexyne-3; 1,3-dimethyl-3 (t-butylperoxy)butyl N[1-{3-(1-methylethenyl)phenyl}1-methylethyl]carbamate; 4-(tert-amylperoxy)-4-methyl-2-pentanol; 4-(tert-butylperoxy)-4-methyl-2-pentanol; 3-(t-butylperoxy)-3-methyl-2-pentanone; 4-methyl-4(tert-butylperoxy)-2-pentanone (e.g., LUPEROX® 120); 1-methoxy-1-tert-butylperoxy cyclohexane; 2,4,6-tri(tert-butylperoxy)triazine; tert-butyl-1,1,3,3-tetramethylbutyl peroxide; 3-methyl-3(tert-butylperoxy)-2-butanol (e.g., LUPEROX® 240); 3-methyl-3(tert-amylperoxy)-2-butanol (e.g., LUPEROX® 540); and mixtures thereof.

The breaker may also include inorganic peroxides. Suitable inorganic peroxides may include, for example: zinc peroxide; calcium peroxide; magnesium peroxide; and mixtures thereof. Additional breakers or oxidizing agents include, for example, persulfates such as ammonium persulfate, potassium persulfate, and sodium persulfate. Other suitable breakers include oxidants, such as bromates including sodium bromate or chlorates including sodium chlorate.

Additionally, carbon-carbon initiators may be used as breakers. For example, carbon-carbon initiators from the class of hexasubstituted ethanes are suitable (e.g., as available in Encyclopedia of Chemical Technology, Kirk-Othmer, Fourth Edition, Vol. 14, 1996, pages 436-53).

The fracture fluid may include at least one polymer or a polymeric viscosifying agent. Suitable polymers are of high molecular weight and increase the viscosity of the fracture fluid to facilitate formation of the fractures and transport of the proppant into the fractures. Crosslinking agents or other additives may also be included to increase the viscosity of the polymer. For example, a guar or derivatized guar polymer may be crosslinked with either borates (boric acid) or zirconium compounds or both. In an exemplary embodiment, the polymer is a water soluble and/or water swellable polymer. Water soluble and water swellable polymers are well known and may be appropriately selected by those skilled in the art.

The fracture fluids may include high viscosity gelled aqueous fluids and high viscosity water-hydrocarbon emulsions. The polymer(s) contained in or making up the fracture fluids may include polymers, such as cross-linked functional polymers. The high viscosity water-hydrocarbon emulsions may include hydratable polysaccharides, polyacrylamides, polyacrylamide copolymers, polylactic acid, and polyvinyl alcohol. Hydratable polysaccharides may include galactomannan gums and derivatives thereof, glucomannan gums and derivatives thereof, and cellulose derivatives. Examples of such compounds are guar gum, locust beam gum, karaya gum, sodium carboxymethylguar, hydroxyethylguar, sodium earboxymethylhydroxyethylguar, hydroxypropylguar, sodium carboxymethylhydroxymethylcellulose, sodium carboxymethyl-hydroxyethylcellulose, and hydroxyethylcellulose.

In one embodiment, the polymer is selected from the group consisting of polysaccharides, polysaccharide derivatives, polyacrylates, polyacrylamides, acrylamide methyl propane sulfonic acid copolymers, polyvinyl alcohols, polylactic acids, polyvinyl pyrrolidones, maleic anhydride methyl vinyl ether copolymers, and polyethylene oxides. In an exemplary embodiment of the present invention, the polymer in the fracture fluid may include functionalized guar derivatives, guar gum, and mixtures thereof.

A suitable polysaccharide, such as guar, may come in any suitable form from which it can be practically obtained. For example, guar may be obtained as a white powder (preferably with a mesh size of 100 to 325). Water soluble polymers may also be used as water thickeners. Useful polysaccharides include standard guar and derivatized or functionalized guars, such as HPG (hydroxypropylguar), hydroxybutylguar, hydroxyethylguar, CMHPG (carboxymethylhydroxypropylguar), carboxymethylguar, carboxymethylhydroxyethylguar and mixtures thereof. Derivatized polymers are particularly useful for higher temperatures as compared to standard (or non-derivatized) guar. Suitable polymers include polysaccharides which are capable of gelling in the presence of a crosslinking agent to form a gelled based fluid. Other suitable hydratable polysaccharides are the glactomannan gums, cellulose and cellulose derivatives, guar gum, locust bean gum, caraya gum, xanthan gum, starch or derivatized starch. Any suitable polymer may be used whether water soluble or insoluble. In an exemplary embodiment, however, the polymer is water soluble or water swellable.

Additionally, "water resistant" (yet water swelling type polymers) may be used to reduce a formation's porosity or water permeability. A variety of polymers are suitable for use as "water-resistant" polymers in embodiments of the present invention including, but not limited to: polyacrylamide, hydrolyzed polyacrylamide, xanthan, scleroglucan, polysaccharides, amphoteric polymers made from polyacrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropapnesulfonic acid copolymers, acrylamide/vinylpyrrolidone copolymers, sodium carboxymethyl cellulose, poly [dialkylaminoacrylate-co-acrylate-g-poly(ethyleneoxide)]. "Water resistant" polymers are explained in more detail in U.S. Pat. No. 7,036,589, which is herein incorporated by reference in its entirety for all purposes.

The polymers may be combined with a fluid, such as water, to form an aqueous solution or dispersion of polymer in the fluid. For example, suitable high molecular weight polyacrylamide type polymers in an aqueous solution or dispersion are described in U.S. Pat. No. 4,659,793, U.S. Pat. No. 4,617,359, and U.S. Pat. No. 4,439,334, all of which are herein incorporated by reference in their entirety for all purposes. Thus, various free radical initiators may be used to polymerize various combinations of monomers in order to produce unique polymers, copolymers, terpolymers, etc. for enhanced oil recovery methods and systems.

Other suitable polymers include "microbial polysaccharides" or heteropolysaccharides, which are commonly known as Sphingans. In particular, these polymers may be useful in the preparation of energized fluids used as hydraulic fracture fluids in aqueous wellbore treatments. Such polymers are described in U.S. Publication No. 2006/0166836 A1, herein incorporated by reference in its entirety for all purposes.

Other water-soluble polymers particularly suited for hostile environments may be useful in the recovery and processing of natural resources. For example, the water-soluble polymers may comprise N-vinyl amide, such as an N-vinyl lactam and copolymers and terpolymers of N-vinyl lactam with unsaturated amides and at least one hydrophilic vinyl-containing sulfonate, phosphonate or ester and/or hydrophilic N-vinyl lactam. Such polymers are described in U.S. Pat. No. 5,186,257, herein incorporated by reference in its entirety for all purposes.

The water swellable polymers may be in the form of hydrophilic water swellable particles or "microgels." U.S. Pat. No. 6,169,058, herein incorporated by reference in its entirety for all purposes, describes hydrophilic water swellable particles that are added to hydrocarbon-based fracture treatment fluids. U.S. Publication No. 2008/0096774 A1, herein incorporated by reference in its entirety for all purposes, describes "microgels" formed by preparing liquid compositions via inverse emulsion polymerization of various methacrylates, allylics, and acrylamide type monomers.

A single polymer may be used or a combination of polymers may be blended together to form the fracture fluid. For example, the guar type (water soluble) and polyacrylamide type (water resistant) polymers may form a polymer blend. Any suitable ratio of polymers may be used to achieve the desired viscosity. For example, polymer blends are described in U.S. Pat. No. 7,036,589, herein incorporated by reference in its entirety for all purposes.

Additional additives, such as accelerators, surfactants, or fluids, such as water, may be included in the fracture fluid. Fluids and surfactants may solvate or swell the polymers. In particular, the surfactants may help to incorporate the polymer in an aqueous phase. Surfactants suitable for use in the fracture fluids include, but are not limited to, anionic, cationic, zwitterionic/amphoteric emulsifiers, and non-ionic types. For example, surfactants described in U.S. Publication No. 2008/0217012 and/or U.S. Pat. No. 7,036,589, both of which are herein incorporated by reference in their entirety for all purposes, may be suitable. In one embodiment, the surfactant is not viscoelastic. The aqueous liquid may be fresh water, salt water, seawater, or any other aqueous liquids, including buffering agents, that would not adversely react with the various breakers or scavengers described herein. Suitable accelerators, especially for use with peroxide breakers, include weak organic acids, tertiary amines, and transition metal types of organo-metallic compounds. Without wishing to be bound to a particular theory, it is believed that the accelerators may help to increase the useable temperature range for the breakers.

According to an exemplary embodiment of the present invention, a mixture for use in a fracture fluid comprises at least one radical scavenger and at least one breaker. In particular, the radical scavenger may be selected from the group consisting of 2,2,6,6-tetramethylpiperidine-1-oxyl; 4-hydroxy-2,2,6,6-tetramethylpiperidine-1-oxyl; nitroxide, 1-(diethoxyphosphinyl)-2,2-dimethylpropyl 1,1-dimethylethyl; slow polymerizing monomers; quinones; hindered phenols; and mixtures thereof; and the breaker may be selected from the group consisting of organic peroxides; inorganic peroxides; azo initiators; and mixtures thereof.

The mixture for use in a fracture fluid including a radical scavenger and a breaker may take any suitable form. For example, the mixture may be in the form of a homogenous liquid, a free-flowing solid powder, a compressed powder (e.g., in non-dusting pellet forms), an encapsulated solid, an encapsulated liquid, or an emulsion/emulsified product. The physical form of the breaker and radical scavenger blend(s) may depend upon the type of equipment used at the oil/gas field site. The forms are desirably either pumpable or pourable at the hydraulic fracturing site. Any suitable equipment or techniques may be used to deliver the fracture fluid into the well bore.

In an exemplary embodiment of the present invention, the mixture of the radical scavenger and the breaker comprises an aqueous liquid, such as water. Any suitable mixing or dispersion techniques may be used to allow components to adequately and uniformly disperse. Solvents, other than water, may also be used, but water is preferred due to its inert nature (e.g., it will not be harmful in end use) and abundance. Suitable quantities of the radical scavenger and the breaker, as will be recognized in the art, may be added to the water to allow for adequate amounts of each to be present in the fracturing fluids while not causing excessive amounts of any filler materials to precipitate out. Due to the ease of dispersion in water, the mixture may intimately associate with the polymer in the fracture fluid. For example, a liquid product may be obtained by mixing a radical scavenger in liquid form with a breaker in liquid form. For instance, the breaker may be dispersed or dissolved in water. Alternatively, the breaker may be in a pure liquid form, e.g., certain peroxides are liquid in pure form. Additionally, the breaker, the radical scavenger, and/or the mixture thereof may be in an emulsified form. For example, both liquid organic peroxides and solid organic peroxides and the radical scavenger may be emulsified to provide a breaker-radical trap system that may be readily pumped or metered.

The mixture of the radical scavenger and the breaker may be in a powder or pelletized form. In one embodiment, the mixture is coated onto or absorbed into a filler material. In particular, the breaker and radical scavenger blend may be coated onto the proppant itself at the appropriate use concentration or as a master batch. It is contemplated that any suitable filler may be used. In an exemplary embodiment, the filler used is the proppant material, such as sand, bauxite, etc. Additionally, the breaker(s) and radical scavengers(s) may be absorbed separately onto fillers for blending at a later time or may be pre-blended and incorporated together into solid inert fillers. The fillers and/or the finished mixture may be a free flowing powder or may be pelletized, e.g., for easier feeding via auger systems.

Suitable particle sizes of the inert fillers may be selected by those skilled in the art. For example, the particle size distribution based upon the proppant used may be about 40/60. In an exemplary embodiment of the present invention, the particle size distribution of the inert filler used as the support for the breaker system may be about 20/40 mesh (e.g., 100% goes through 20 and 0% goes through 40 mesh).

Additionally, it is contemplated that the blend of radical scavenger(s) and breaker(s) or the individual components may be encapsulated by various means available in the art. For example, the combined radical scavenger delay along with an encapsulated delay may provide a synergistic benefit in hydraulic fracturing operations.

In one embodiment, the fracture fluid mixture comprises a proppant, a water soluble or water swellable polymer, a radical scavenger, a breaker, and an aqueous fluid. In an exemplary embodiment, the fracture fluid additionally comprises an accelerator. Suitable accelerators, such as metals and amines, may be selected by one of ordinary skill in the art. In another embodiment, the fracture fluid additionally comprises at least one surfactant.

The weight percent of constituents of the fracture fluid may be present in any suitable amounts. In particular, the weight percent or parts of breaker needed versus parts of fracturing fluid may depend upon the starting active oxygen content of the breaker and the concentration of the polymer (e.g., guar or polyacrylamide polymer) in the aqueous phase. Weight percent or parts of breaker (e.g., organic peroxide(s), azo(s) and/or inorganic peroxides(s)) required on a pure basis may be in the range of from about 0.0001% (1 ppm) to 10% (100,000 ppm). Preferably, the amounts of breaker may be in the range of about 0.0002% (2 ppm) to 5% (50,000 ppm). More preferably, the breaker may be present at about 0.0005% (5 ppm) to 3% (30,000 ppm). Even more preferably, the breaker may be present in the fracture fluid composition at about 0.0010% (10 ppm) to 2% (20,000 ppm) based on the fracturing fluid. In an exemplary embodiment, the breaker is present in amount of about 1 ppm to about 100,000 ppm by weight based on the fracturing fluid. The breaker may also be used in amounts from about 0.01 gallon per thousand of breaker up to about 100 gallons per thousand (GPT) of fracture fluid, preferably about 1 GPT of breaker to about 50 GPT of fracture fluid, and even more preferably about 1 GPT of breaker to about 20 GPT of fracture fluid.

The weight percent or parts of radical scavenger(s) needed may depend upon the type and amount of water soluble/swellable polymer(s) in the aqueous fluid and the type and amount of breaker(s) used to degrade the polymer(s). The range of radical scavenger relative to breaker is about 0.01 parts to 100 parts of radical scavenger(s) based on 100 parts of pure breaker used. Preferably, the ratio of radical scavenger to breaker is about 0.1 parts to 80 parts radical scavenger to 100 parts breaker. More preferably, the ratio of radical scavenger to breaker is about 1 part to 70 parts radical scavenger to 100 parts breaker. Even more preferably, the ratio of radical scavenger to breaker is about 5 parts to 60 parts radical scavenger with respect to 100 parts pure breaker used. In an exemplary embodiment, the radical scavenger is present in an amount of about 0.01 to 100 parts by weight of the radical scavenger relative to 100 parts by weight of the breaker.

According to an embodiment of the present invention, a method of using a fracture fluid in a fracturing operation comprises introducing a fracture fluid comprising a proppant and a polymer into a subterranean formation to form at least one fracture. The proppant is deposited in the fracture and subsequently, the viscosity of the fracture fluid is reduced with a breaker. Degradation of the polymer is delayed by adding a radical scavenger to the fracture fluid.

The fracture fluid may be pumped or injected into the subterranean rock formation using any suitable equipment or techniques known in the art. Typically, the high viscosity fracture fluid is injected into a well bore under high pressure. Once the natural reservoir pressures are exceeded, the fracturing fluid initiates fracture in the formation, which generally continues to grow during pumping. It is usually preferred that the fluid reaches a maximum viscosity as it enters the fracture for optimal fracturing.

The fracture fluid may include a proppant. The proppants or propping agents are carried by the fracture fluid to be deposited in the cracks where they prop open the cracks created by the hydraulic fracturing. The proppant remains in the produced fracture to prevent closure of the fractures and to form a channel extending from the well bore into the formation once the fracturing fluid is recovered. Any suitable proppant, such as sand, may be used, as is well known in the art.

Once the fractures are formed and the proppants are deposited, the fracture fluid is recovered by reducing the viscosity of the fluid. As the viscosity lowers, it flows from the formation under the influence of formation fluids and pressure, but leaves the proppant in the cracks. The viscosity of the fracture fluid is reduced with a breaker. Unfortunately, the breakers may be difficult to control, especially in aqueous phase. In particular, the breakers immediately and/or prematurely begin to reduce the viscosity of the fracture fluid before the fractures are able to form and/or the proppants are deposited.

It has been discovered that by adding at least one radical scavenger to the fracture fluid, degradation of the polymer is delayed or retarded. This is particularly useful in delaying the degradation of the fracture fluid until a specific time, pH, or temperature value or range is reached. In other words, the high viscosity of the fracture fluid is maintained or protected for a certain duration, at a certain pH, or during a certain temperature range. Without wishing to be bound to a particular theory, the radical scavengers work by complexing or reacting with oxygen or carbon centered radicals, depending upon the choice of radical scavenger chemistry chosen, that are generated during fracturing stimulation operations, thereby delaying the decomposition of the polymer gel. In particular, the effective range for radical trapping or complexation is from about 100° F. to 500° F.

It is contemplated, particularly in cases where the fracture fluid viscosity needs to be maintained for extended periods of time downhole, that the radical scavenger(s) may be added first without the breaker(s) as part of the initial fracturing process. Thus, in an exemplary embodiment, the viscosity of the polymer is maintained for a given period of time prior to adding the breaker. Then, later in the process, the breaker(s) can be incorporated into the fracture fluid, with or without additional radical scavenger(s).

In another embodiment, the breaker is added to the fracture fluid prior to introducing the fracture fluid into the subterranean formation. Thus, the at least one breaker may be a mixture with the radical scavenger(s) to be added to the fracture fluid, a component in the fracture fluid, or simultaneously mixed with the fracture fluid as it is pumped into the well.

The high viscosity of the fracture fluid is maintained or protected for a certain duration, pH, or during a certain temperature range. The timing for the breaker to be effective at reducing the viscosity of the fracture fluid may depend on the duration and quantity of breaker relative to other constituents in the fracture fluid, the pH, e.g., of the fracture fluid, and/or the temperature profile. In particular, the time/pH/temperature profile of the breakers may be based on the half-life of the specific breaker and its active oxygen content. Typically, the breaker is more active as it approaches higher temperatures. Instead of merely adjusting the type, amount, pH, or timing of introducing the breaker, the radical scavenger delays the degradation of the polymer(s) by the breaker. In one embodiment, the radical scavengers are chosen based on the temperatures when the breakers are active. The effective temperature range for the delayed breaking of polymer based fracture fluids may range from about 100° F. to 500° F., depending upon the type of polymer, radical scavenger, and breakers utilized. It is well known in the art that every hydraulic fracturing job is different and selection of the radical scavenger and breaker may depend on many factors. In an exemplary embodiment, the radical scavenger is effective at temperatures of about 100° F. to about 500° F. In a preferred embodiment, the radical scavenger is effective at about 125° F. to 450° F.

In another embodiment of the present invention, a method of fracturing a subterranean formation comprises providing a fracture fluid comprising a proppant, a polymer, and a breaker and adding a radical scavenger to the fracture fluid. The fracture fluid is supplied to a desired location in a subterranean formation and the fracture fluid is maintained with sufficient viscosity to form at least one fracture. The breaker is allowed to degrade the polymer and reduce the viscosity of the fracture fluid at a specific time or temperature.

Thus, aspects of the present invention include compositions for use in fracture fluids, the fracture fluid compositions themselves, methods for using the fracture fluids, and methods for forming subterranean formations. By adding at least one radical scavenger to the fracture fluid, degradation of the polymer in the fracture fluid may be delayed or retarded until a specific time or temperature is reached. Consequently, the fracture fluid is able to appropriately fracture the formation under certain pressure and temperature conditions without the breakers prematurely reducing the viscosity of the fracture fluid.

EXAMPLE

The benefit of using 6% by weight of an MTBHQ (mono-t-butyl hydroquinone) radical scavenger with DIBHP (diisopropylbenzene Hydroperoxide available as Luperox® DIBHP from Arkema Inc.) peroxide breaker to control the viscosity decrease (break-time) of a polyacrylamide fracture fluid viscosity was evaluated. The use of MTBHQ with the peroxide resulted in an desirable higher initial viscosity of the fracture-fluid, which stayed above 100 cps for about one hour. A high fracture-fluid viscosity of >100 cps is important to properly suspend the propant such as "sand" in the fracturing fluid so that it flows into and props open the rock-cracks. If the peroxide "breaker" degrades the viscosity of the fracture fluid too soon, the lowered viscosity can no longer suspend the sand and all the sand can wind up at the bottom of the well, essentially killing the well flow and offering no expansion of the cracks along the well to provide enhanced oil or gas flow.

The MTBHQ radical scavenger was discovered to provided a means to control the peroxide break-time of the fracture-fluid. The MTBHQ radical scavenger provided a delay in the reduction of fracture fluid viscosity, a delay in break time. It also provided a desirable higher initial build-up in viscosity to efficiently suspend the propant during the early stages of crack expansion. Allowing proper suspension of the propant and filling/expansion of the rock-cracks. Based upon these particular conditions of temperature, fluid-type and sand considered for use, the critical viscosity required to keep the sand suspended was determined to be 100 cps. The DIBHP peroxide was an efficient breaker at a 1% weight use level. However, it was "too efficient" and the break time was to short. The use of 1% by weight DIBHP peroxide breaker resulted in the fracture-fluid viscosity is decreasing much too quickly, without proper control and could not suspend the propant effectively. The mixture did not maintain the viscosity above 100 cps for sufficient time required to pump the fluid and suspended sand down the well and into the expanding cracks. The additional of MTBHQ radical scavenger at a concentration of 6% by weight based on the peroxide was found to provide a build-up of viscosity for the fracture fluid to facilitate the suspension of propant. Viscosities peaked to 200 cps and drifted down to 100 cps over one hour, after which it continued to decline in viscosity to below 50 cps viscosity after 180 minutes. The decrease, after time to below 50 cps is desirable so as to provide a lower viscosity at the completion of the operation.

The fracture fluid consisted of a polyacrylamide based polymer water-in-oil emulsion that was dispersed at a concentration of 60 gpt (gallons per thousand) concentration into a brine solution. The brine solution consisted of 12 ppg (pound per gallon) NaCl/NaBr in water. This final 200 cps solution was then studied to compare the break-time performance of the peroxide formulations.

Figure 1:
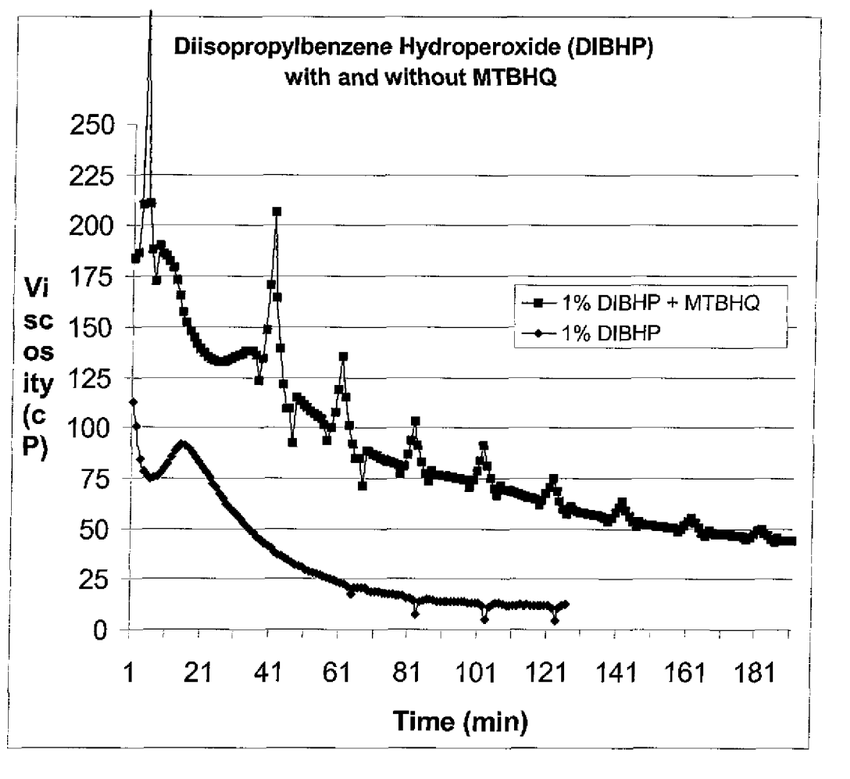
FIG. 1 is a graph of viscosity (centipoise) verses time (minutes).

The first peroxide tested was DIBHP (diisopropylbenzene hydroperoxide available as Luperox® DIBHP from Arkema Inc.) with an approximate assay of 50%. It was tested at 1% "as is" from the container, which is equivalent to 10 gpt (10 gallons per thousand gallons of fracture fluid). A solution of 94 wt % Luperox® DIBHP with 6 wt % MTBHQ was prepared by mixing the solid MTBHQ into the liquid Luperox® DIBHP peroxide at room temperature with stirring. 1% of this solution, which is equivalent to 10 gpt of peroxide to fracture fluid, was used. Viscosity was measured with a Grace® M5600 instrument at a 93° C. reaction temperature for 180 minutes. FIG. 1 summarizes the results described above While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for using a fracture fluid in forming subterranean fractures comprising delaying degradation of a polymer or polymeric viscosifying agent in a fracture fluid at a temperature from about 125° F. to about 450° F., when the fracture fluid comprises at least one polymer or polymeric viscosifying agent, a breaker and water, by combining at least one radical scavenger with the fracture fluid, wherein the radical scavenger comprises at least one moiety selected from the group consisting of nitroxide radicals, quinones, hindered phenols, hydroxylamines, and slow polymerizing monomers, 2,2,6,6-tetramethylpiperidine-1-oxyl; 4-hydroxy-2,2,6,6-tetramethylpiperidine-1-oxyl; nitroxide; 1-(diethoxyphosphinyl)-2,2-dimethylpropyl 1,1-dimethylethyl, mono-t-butyl hydroquinone and mixtures thereof; and wherein the breaker is selected from the group consisting of organic peroxides, inorganic peroxides, azo initiators, bromates, chlorates, persulfates, and mixtures thereof.

2. A method according to claim 1, wherein the radical scavenger comprises a nitroxide radical.

3. A method according to claim 1, wherein the radical scavenger comprises at least one compound selected from the group consisting of quinones, hindered phenols, hydroxylamines, and slow polymerizing monomers.

4. A method according to claim 1, wherein the radical scavenger is selected from the group consisting of 2,2,6,6-tetramethylpiperidine-1-oxyl; 4-hydroxy-2,2,6,6-tetramethylpiperidine-1-oxyl; nitroxide, 1-(diethoxyphosphinyl)-2,2-dimethylpropyl 1,1-dimethylethyl; and mixtures thereof.

5. A method according to claim 1, wherein the radical scavenger is mono-t-butyl hydroquinone.

6. A method according to claim 1, wherein the polymer is a water soluble or water swellable polymer.

7. A method according to claim 1, wherein the polymer is selected from the group consisting of polysaccharides, polysaccharide derivatives, polyacrylates, polyacrylamides, acrylamide methyl propane sulfonic acid copolymers, polyvinyl alcohols, polylactic acids, polyvinyl pyrrolidones, maleic anhydride methyl vinyl ether copolymers, polyethylene oxides; and mixtures thereof.

8. A mixture for use in a fracture fluid at a temperature from about 125° F. to about 450° F., said fracture fluid comprising at least one polymer or polymeric viscosifying agent and water, said mixture comprising a radical scavenger and a breaker, wherein the radical scavenger comprises at least one moiety selected from the group consisting of nitroxide radicals, quinones, hindered phenols, hydroxylamines, and slow polymerizing monomers, 2,2,6,6-tetramethylpiperidine-1-oxyl; 4-hydroxy-2,2,6,6-tetramethylpiperidine-1-oxyl; nitroxide, 1-(diethylphosphinyl)-2,2-dimethylpropyl 1,1-dimethylethyl, mono-t-butyl hydroquinone, and mixtures thereof; and wherein the breaker is selected from the group consisting of organic peroxides, inorganic peroxides, azo initiators, bromates, chlorates, persulfates, and mixtures thereof.

9. A mixture according to claim 8, wherein the radical scavenger is selected from the group consisting of 2,2,6,6-tetramethylpiperidine-1-oxyl; 4-hydroxy-2,2,6,6-tetramethylpiperidine-1-oxyl; nitroxide, 1-(diethoxyphosphinyl)-2,2-dimethylpropyl 1,1-dimethylethyl; and mixtures thereof; and the breaker is selected from the group consisting of organic peroxides; inorganic peroxides; azo initiators; oxidizing agents; and mixtures thereof.

10. A mixture according to claim 8, wherein the breaker is an organic peroxide selected from the group consisting of solid peroxydicarbonates, diacyl peroxides, peroxyesters, monoperoxycarbonates, dialkyl peroxides, peroxyketals, hydroperoxides, ketone peroxides, endoperoxides, and mixtures thereof.

11. A mixture according to claim 8, wherein the mixture is in the form of a homogenous liquid, a free-flowing solid powder, a compressed powder, an encapsulated solid, an encapsulated liquid, or an emulsion.

12. A mixture according to claim 8, wherein the mixture comprises an aqueous liquid.

13. A mixture according to claim 8, wherein the mixture is coated onto or absorbed into a filler material.

14. A fracture fluid mixture comprising:
a proppant;
a water soluble or water swellable polymer selected from the group consisting of polysaccharides, polysaccharide derivatives, polyacrylates, polyacrylamides, acrylamide methyl propane sulfonic acid copolymers, polyvinyl alcohols, polylactic acids, polyvinyl pyrrolidones, maleic anhydride, methyl vinyl ether copolymers, polyethylene oxides; and mixtures thereof;
a radical scavenger comprising at least one moiety selected from the group consisting of nitroxide radicals, quinones, hindered phenols, hydroxylamines, and slow polymerizing monomers, 2,2,6,6-tetramethylpiperidine-1-oxyl; 4-hydroxy-2,2,6,6-tetramethylpiperidine-1-oxyl; nitroxide, 1-(diethoxyphosphinyl)-2,2-dimethylpropyl 1,1-dimethylethyl, mono-t-butyl hydroquinone, and mixtures thereof;
a breaker; and
an aqueous fluid.

15. A fracture fluid according to claim 14, further comprising an accelerator.

16. A fracture fluid according to claim 14, wherein the radical scavenger is present in an amount of about 0.01 to 100 parts by weight of the radical scavenger relative to 100 parts by weight of the breaker.

17. A fracture fluid according to claim 14, wherein the breaker is present in amount of about 1 ppm to about 100,000 ppm by weight based on the fracturing fluid.

18. A fracture fluid according to claim 14, additionally comprising at least one surfactant.

\* \* \* \* \*